United States Patent
Osaka

(10) Patent No.: US 7,522,430 B2
(45) Date of Patent: Apr. 21, 2009

(54) SWITCHING POWER SUPPLY APPARATUS

(75) Inventor: Syohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 352 days.

(21) Appl. No.: 11/587,576

(22) PCT Filed: Apr. 21, 2005

(86) PCT No.: PCT/JP2005/007602

§ 371 (c)(1),
(2), (4) Date: Oct. 25, 2006

(87) PCT Pub. No.: WO2005/107053

PCT Pub. Date: Nov. 10, 2005

(65) Prior Publication Data

US 2007/0274105 A1    Nov. 29, 2007

(30) Foreign Application Priority Data

Apr. 28, 2004  (JP) .............................. 2004-133266

(51) Int. Cl.
*H02M 3/335* (2006.01)
(52) U.S. Cl. ................. 363/21.02; 363/21.03
(58) Field of Classification Search ............... 363/21.02, 363/21.03, 131
See application file for complete search history.

(56) References Cited

U.S. PATENT DOCUMENTS 6,317,341 B1 * 11/2001 Fraidlin et al. ........... 363/56.09

7,116,561 B2   10/2006 Osaka

FOREIGN PATENT DOCUMENTS

| JP | 56-168240 | 12/1981 |
|----|-----------|---------|
| JP | 59-99581 | 7/1984 |
| JP | 03-103069 | 4/1991 |
| JP | 7-63216 | 7/1995 |
| JP | 08-066025 | 3/1996 |
| JP | 2000-023455 | 1/2000 |

OTHER PUBLICATIONS

U.S. Appl. No. 11/587,576, filed Oct. 25, 2006, Osaka.

* cited by examiner

*Primary Examiner*—Shawn Riley
(74) *Attorney, Agent, or Firm*—Oblon, Spivak, McClelland, Maier & Neustadt, P.C.

(57) ABSTRACT

A switching power supply that can accurately detect a period during energy is supplied from a primary side to a secondary side of a transformer with a simple circuit configuration is provided. A first switching element and a second switching element are serially connected to opposite output ends of a full-wave rectifier rectifying an AC voltage from an AC power source. A current resonant capacitor, a resonant reactor, and a primary winding of a resonant transformer are serially connected to opposite ends of the first switching element. A rectifying and smoothing circuit rectifies and smoothes a voltage of a secondary winding, a control circuit alternately turning on and off the first switching element and the second switching element based on an output voltage of the rectifying and smoothing circuit, and a resonant period detection circuit detects a period, during which energy is transmitted from a primary side to a secondary side, based on a voltage of an auxiliary winding tightly coupled with the secondary winding, and outputs a resonant period detection signal.

10 Claims, 11 Drawing Sheets

SWITCHING POWER SUPPLY APPARATUS

TECHNICAL FIELD

The present invention relates to a highly effective switching power supply, and more specifically, relates to a current-resonant switching power supply that detects a period during which energy is transmitted from a primary side to a secondary side of a resonant transformer, in order to keep an optimum resonant state.

BACKGROUND ART

A conventional current-resonant switching power supply is shown in FIG. 1. In FIG. 1, a full-wave rectifier 2 (corresponding to an input rectifier circuit) rectifies an AC voltage from an AC power source 1 and outputs a full-wave current-voltage to a smoothing capacitor 3. The smoothing capacitor 3 smoothes the full-wave current-voltage of the full-wave rectifier circuit 2.

A series circuit of a first switching element Q1 formed by a MOSFET or the like and a second switching element Q2 formed by the MOSFET or the like is connected to the opposite ends of the smoothing capacitor 3. A rectifier (diode) 6 is connected in parallel to the first switching element Q1, and a rectifier 7 is connected in parallel to the second switching element Q2. A voltage resonant capacitor Crv is connected in parallel to the first switching element Q1.

A series circuit of a current resonant capacitor Cri, a reactor Lr, and a primary winding P1 of a resonant transformer T is connected in parallel to the first switching element Q1. A resonant circuit is formed with the voltage resonant capacitor Crv, the current resonant capacitor Cri, the resonant reactor Lr, and the primary winding P1 of the resonant transformer T.

The primary winding P1 and a secondary winding S of the resonant transformer T are wound so that a common mode voltage is generated respectively, and a rectifying and smoothing circuit formed with a rectifier $D_0$ and a smoothing capacitor 14 is connected to the secondary winding S of the resonant transformer T. The rectifying and smoothing circuit rectifies and smoothes a voltage (ON/OFF controlled pulse voltage) induced by the secondary winding S of the resonant transformer T and outputs a DC output to a load 16.

A voltage detection circuit 15 is connected to the opposite ends of the smoothing capacitor 14, to detect an output voltage of the smoothing capacitor 14, and outputs the detected voltage to a control circuit 11a. The control circuit 11a controls the voltage of the load 16 to maintain a constant voltage by turning on and off alternately the first switching element Q1 and the second switching element Q2 according to PWN control, based on the detected voltage from the voltage detection circuit 15. In this case, the first switching element Q1 and the second switching element Q2 are alternately turned on and off by applying the voltage to respective gates of the first switching element Q1 and the second switching element Q2.

The operation of the thus formed conventional resonant switching power supply is explained with reference to timing charts in FIGS. 2 to 4. FIG. 2 is a timing chart of a signal in respective units of the switching power supply. FIG. 3 shows a timing chart of the respective signals indicating in detail a period during which energy is transmitted from the primary side to the secondary side of the resonant transformer in the switching power supply. FIG. 4 is a detailed timing chart in periods T1 to T10 of the signal in the respective units of the switching power supply.

In FIGS. 2 to 4, reference sign $I_{P1}$ denotes a current flowing to the primary winding P1, $V_{Q1}$ denotes both terminal voltage of the first switching element Q1, $I_{Q1}$ denotes a current flowing to the first switching element Q1, $V_{Q2}$ denotes both terminal voltage of the second switching element Q2, $I_{Q2}$ denotes a current flowing to the second switching element Q2, $V_{D0}$ denotes a voltage of the rectifier $D_0$, $I_{D0}$ denotes a current flowing to the rectifier $D_0$, $V_{P1}$ denotes both terminal voltage of the primary winding P1, and $V_S$ denotes a both terminal voltage of the secondary winding S. The resonant reactor Lr is sufficiently smaller than an exciting inductance Lp of the primary winding P1, and the voltage resonant capacitor Crv is sufficiently smaller than the current resonant capacitor Cri.

In the period T1, the first switching element Q1 is turned OFF, and the second switching element Q2 has just been changed from ON to OFF. A resonance current $I_{P1}$ passes through a path extending along the resonant reactor Lr, the primary winding P1, the voltage resonant capacitor Crv, the current resonant capacitor Cri, and the resonant reactor Lr by the energy stored in the resonant reactor Lr and the exciting inductance Lp of the resonant transformer T. The voltage resonant capacitor Crv discharges due to the resonance of the exciting inductance Lp of the resonant transformer T, the resonant reactor Lr, and the voltage resonant capacitor Crv, and hence, the voltage $V_{Q1}$ drops and the voltage $V_{Q2}$ rises.

In the period T2, both the first switching element Q1 and the second switching element Q2 are turned OFF. The voltage resonant capacitor Crv finishes discharge, and the voltage $V_{Q1}$ is zero and the voltage $V_{Q2}$ is equal to the both terminal voltage of the smoothing capacitor 3. The resonance current $I_{P1}$ continues to pass through a path extending along the resonant reactor Lr, the primary winding P1, the rectifier 6, the current resonant capacitor Cri, and the resonant reactor Lr. At this time, the first switching element Q1 is turned ON, and phase shifts to the period T3. In the period T3, the first switching element Q1 is turned ON, and the second switching element Q2 is turned OFF.

The current $I_{P1}$ continues to pass through a path extending along the resonant reactor Lr, the primary winding P1, the first switching element Q1, the current resonant capacitor Cri, and the resonant reactor Lr while decreasing, and when the current becomes zero, the phase shifts to the period T4.

In the period T4, the first switching element Q1 is turned ON, and the second switching element Q2 is OFF. The flow direction of current $I_{P1}$ is reversed, and the resonance current passes through a path extending along the primary winding P1, the resonant reactor Lr, the current resonant capacitor Cri, the first switching element Q1, and the primary winding P1, and magnetic flux of the transformer T is reset.

In the periods T1 to T4, the current $I_{P1}$ and the current $I_{Q1}$ flow due to the resonance of the exciting inductance Lp of the resonant transformer T, the resonant reactor Lr, and the current resonant capacitor Cri.

In the period T5, the first switching element Q1 is OFF and the second switching element Q2 is OFF. The current $I_{P1}$ passes through a path extending along the primary winding P1, the resonant reactor Lr, the current resonant capacitor Cri, the voltage resonant capacitor Crv, and the primary winding P1. The current resonant capacitor Crv is charged due to the resonance of the exciting inductance Lp of the resonant transformer T, the resonant reactor Lr, and the voltage resonant capacitor Crv, and the voltage $V_{Q1}$ rises and the voltage $V_{Q2}$ drops.

In the period T6, both the first switching element Q1 and the second switching element Q2 are OFF. The voltage resonant capacitor Crv is charged up to the voltage of the smoothing capacitor 3, so that the voltage $V_{Q1}$ becomes equal to the voltage of the smoothing capacitor 3 and the voltage $V_{Q2}$ becomes zero. The resonance current $I_{P1}$ continues to pass through a path extending along the primary winding P1, the resonant reactor Lr, the current resonant capacitor Cri, the smoothing capacitor 3, the rectifier 7, and the primary winding P1. In the period T7, the second switching element Q2 is turned ON, and the first switching element Q1 is still OFF. The resonance current continues to pass through a path extending along the primary winding P1, the resonant reactor Lr, the current resonant capacitor Cri, the smoothing capacitor 3, the second switching element Q2, and the primary winding P1. In the periods T5 to T7, the current $I_{P1}$ and the current $I_{Q2}$ flow due to the resonance of the exciting inductance Lp of the resonant transformer T, the resonant reactor Lr, and the current resonant capacitor Cri.

In the period T8, the second switching element Q2 is turned ON and the first switching element Q1 is OFF. The resonance current $I_{P1}$ and the current $I_{Q2}$ pass through a path extending along the second switching element Q2, the primary winding P1, the resonant reactor Lr, and the current resonant capacitor Cri, and the current $I_{D0}$ starts to flow to the secondary side rectifier $D_0$. In the period T9, the second switching element Q2 is ON and the first switching element Q1 is OFF. The current $I_{P1}$ and the current $I_{Q2}$ pass through a path extending along the current resonant capacitor Cri, the resonant reactor Lr, the primary winding P1, and the second switching element Q2.

In the periods T8 and T9, the current $I_{P1}$ and the current $I_{Q2}$ flow due to the resonance of the resonant reactor Lr and the current resonant capacitor Cri. In the periods T8 and T9, energy is transmitted from the primary winding P1 to the secondary winding S of the resonant transformer T. At this time, the current $I_{D0}$ transmitted from the primary side to the secondary side rises while drawing an arc, and at a certain point, starts to drop and becomes zero when a resonance period t1 (corresponding to the periods T6 to T9) has passed. The energy transmitted to the secondary side is rectified and smoothed by the rectifier $D_0$ and the smoothing capacitor 14, and the DC power is supplied to the load 16.

In the period T10, the second switching element Q2 keeps the ON state, and the current $I_{P1}$ and the current $I_{Q2}$ pass through a path extending along the current resonant capacitor Cri, the resonant reactor Lr, the primary winding P1, and the second switching element Q2, but the current $I_{D0}$ stops to flow. In the period T10, the current $I_{P1}$ and the current $I_{Q2}$ flow due to the resonance of the exciting inductance Lp of the resonant transformer T, the resonant reactor Lr, and the current resonant capacitor Cri. When the period T10 (corresponding to the period t2 decided based on an oscillating frequency or a duty ratio) has passed, the second switching element Q2 is turned OFF and the first switching element Q1 is turned ON, and the phase shifts to a reset period t3 (corresponding to the periods T1 to T5).

DISCLOSURE OF THE INVENTION

In the above operation, when the second switching element Q2 is turned off in the period t1, during which energy is supplied to the secondary side, zero current switching is not carried out, and thus, a switching loss of the second switching element Q2 increases, and there is a possibility of breakdown in the worst case.

In a conventional example as shown in FIG. 1, the second switching element Q2 is configured to turn ON in a sufficient large period (t1+t2) so as not to turn OFF in the period t1 that causes off-resonance as the period t1 varies according to input voltage fluctuations and/or load fluctuations. Furthermore, it is necessary to extend the period t2, so that off-resonance does not occur due to a variation of parts and characteristic change due to environmental conditions.

In the period t2, during which even when the second switching element Q2 is turned ON, energy is not supplied to the secondary side, the exciting current is allowed to flow to the resonant transformer T via the current resonant capacitor Cri, and hence, power loss occurs. This occurrence of loss is not directly due to an operation for supplying energy to the secondary side, i.e. its original object, and thus, it is not necessary and causes an efficiency drop of the power supply.

To solve such a problem, a series resonant converter has been proposed in Japanese Patent Application Publication No. H7-63216, and a block diagram of the converter is shown in FIG. 5. In this converter, a series circuit of two switching elements 102 and 103, a series circuit of two rectifiers 104 and 105, and a series circuit of two capacitors 106 and 107 are respectively connected to a DC power source 101, a node of the rectifiers 104 and 105 is connected to a node of the capacitors 106 and 107, a series circuit of a primary winding of a transformer 108 and a reactor 109 is connected to between the node of the rectifiers 104 and 105 and the node of the capacitors 106 and 107, and a rectifier circuit 110 and an output capacitor 111 are connected to a secondary winding of the transformer 108. The converter further includes a transformer voltage detection circuit 130 detecting a voltage of the secondary winding of the transformer 108, and a logic circuit 150 comparing the output of the transformer voltage detection circuit 130 with a drive signal for controlling the switching elements, wherein the logic circuit 150 turns ON the switching elements 102 and 103 in a period during which a voltage is generated in the transformer 108, and turns OFF the switching elements 102 and 103 when there is no voltage in the transformer 108.

In this series resonant converter, when the period for supplying the energy to the secondary side has finished, the voltage applied to the transformer becomes zero, and the voltage induced in the secondary winding also becomes zero.

However, the series resonant converter described in Japanese Patent Application Publication No. H7-63216 should employ the logic circuit 150 that compares the output of the transformer voltage detection circuit 30 with the drive signal for controlling the switching elements, and turns ON the switching elements 102 and 103 in the period during which a voltage is generated in the transformer 108, and turns OFF the switching elements 102 and 103 when there is no voltage in the transformer 108 has to be provided, thereby making the circuit configuration complicated.

On the other hand, in the power supply shown in FIG. 1, the voltage $V_{P1}$ of the primary winding P1 of the resonant transformer T shown in FIG. 3 does not become zero at the last clock of the period t1, and thus, there is a problem in that the period for supply the energy from the primary side to the secondary side cannot be detected accurately, only by simply providing an auxiliary winding to detect the voltage.

Furthermore, when the voltage of the secondary winding is to be detected, it is necessary to insulate the control circuit on the primary side to transmit a signal, thereby making the circuit configuration complicated.

Means for Solving the Problems

According to the present invention, a resonant switching power supply that can accurately detect the period during which energy is supplied from the primary side to the secondary side of the transformer with a simple circuit configuration, and can perform switching control with an optimum ON period, without causing off-resonance can be provided.

According to a first technical aspect of the present invention, the switching power supply comprises: a resonant transformer having a primary winding, a secondary winding, and an auxiliary winding tightly coupled to the secondary winding; a first series circuit in which a first switching element and a second switching element connected in parallel to an output of a non-AC power source are serially connected; a voltage resonant capacitor connected to opposite ends of the first switching element or the second switching element; a second series circuit in which a current resonant capacitor, a resonant reactor, and the primary winding of the resonant transformer are serially connected; a rectifying and smoothing circuit that rectifies and smoothes a voltage of the secondary winding of the resonant transformer; a control circuit that turns on and off alternately the first switching element and the second switching element, based on an output voltage of the rectifying and smoothing circuit; and a resonant period detector that detects a period during which energy is transmitted from a primary side to a secondary side of the resonant transformer based on a voltage of the auxiliary winding of the resonant transformer, and outputs a resonant period detection signal.

According to a second technical aspect of the present invention, in the switching power supply according to the first technical aspect, the resonant period detector comprises a rectifier serially connected to the auxiliary winding, a first resistance connected in parallel to a series circuit of the auxiliary winding and the rectifier, and a second resistance connected in parallel to the first resistance via a coupling capacitor, and outputs both terminal voltage of the second resistance.

According to a third technical aspect of the present invention, in the switching power supply according to the first technical aspect, the resonant period detector comprises a rectifier connected in parallel to the auxiliary winding via a coupling capacitor, and a resistance connected in parallel to the rectifier, and outputs both terminal voltage of the resistance.

According to a fourth technical aspect of the present invention, in the switching power supply according to the first technical aspect, the resonant period detector transmits the resonant period detection signal to the control circuit, and the control circuit controls so as to maintain the ON state or the OFF state of the respective switching elements, in a period during which energy is transmitted from the primary side to the secondary side of the resonant transformer, based on the resonant period detection signal from the resonant period detector.

According to a fifth technical aspect of the present invention, in the switching power supply according to the first technical aspect, the rectifying and smoothing circuit has a third switching element that rectifies the voltage of the secondary winding of the resonant transformer, and the resonant period detector turns on or off the third switching element based on the resonant period detection signal.

According to a sixth technical aspect of the present invention, a switching power supply comprises: a resonant transformer having a primary winding, a secondary winding, and a first auxiliary winding and a second auxiliary winding tightly coupled to the secondary winding; a first series circuit in which a first switching element and a second switching element connected in parallel to an output of a non-AC power source are serially connected; a voltage resonant capacitor connected to opposite ends of the first switching element of the second switching element; a second series circuit in which a current resonant capacitor, a resonant reactor, and the primary winding of the resonant transformer are serially connected to opposite ends of the first switching element or the second switching element; a rectifying and smoothing circuit that rectifies and smoothes a voltage of the secondary winding of the resonant transformer; a control circuit that turns on and off alternately the first switching element and the second switching element, based on an output voltage of the rectifying and smoothing circuit; a first resonant period detector that detects a period during which energy is transmitted from a primary side to a secondary side of the resonant transformer based on a voltage of the first auxiliary winding of the resonant transformer, and outputs a resonant period detection signal; and a second resonant period detector that detects a period during which energy is transmitted from the primary side to the secondary side of the resonant transformer based on a voltage of the second auxiliary winding of the resonant transformer, and outputs a resonant period detection signal. The rectifying and smoothing circuit has a third switch that rectifies the voltage of the secondary winding of the resonant transformer, and the second resonant period detector turns on or off the third switching element based on the resonant period detection signal.

BEST MODE FOR CARRYING OUT THE INVENTION

A switching power supply according to the present invention will be explained below with reference to the drawings.

First Embodiment

Figure 1:
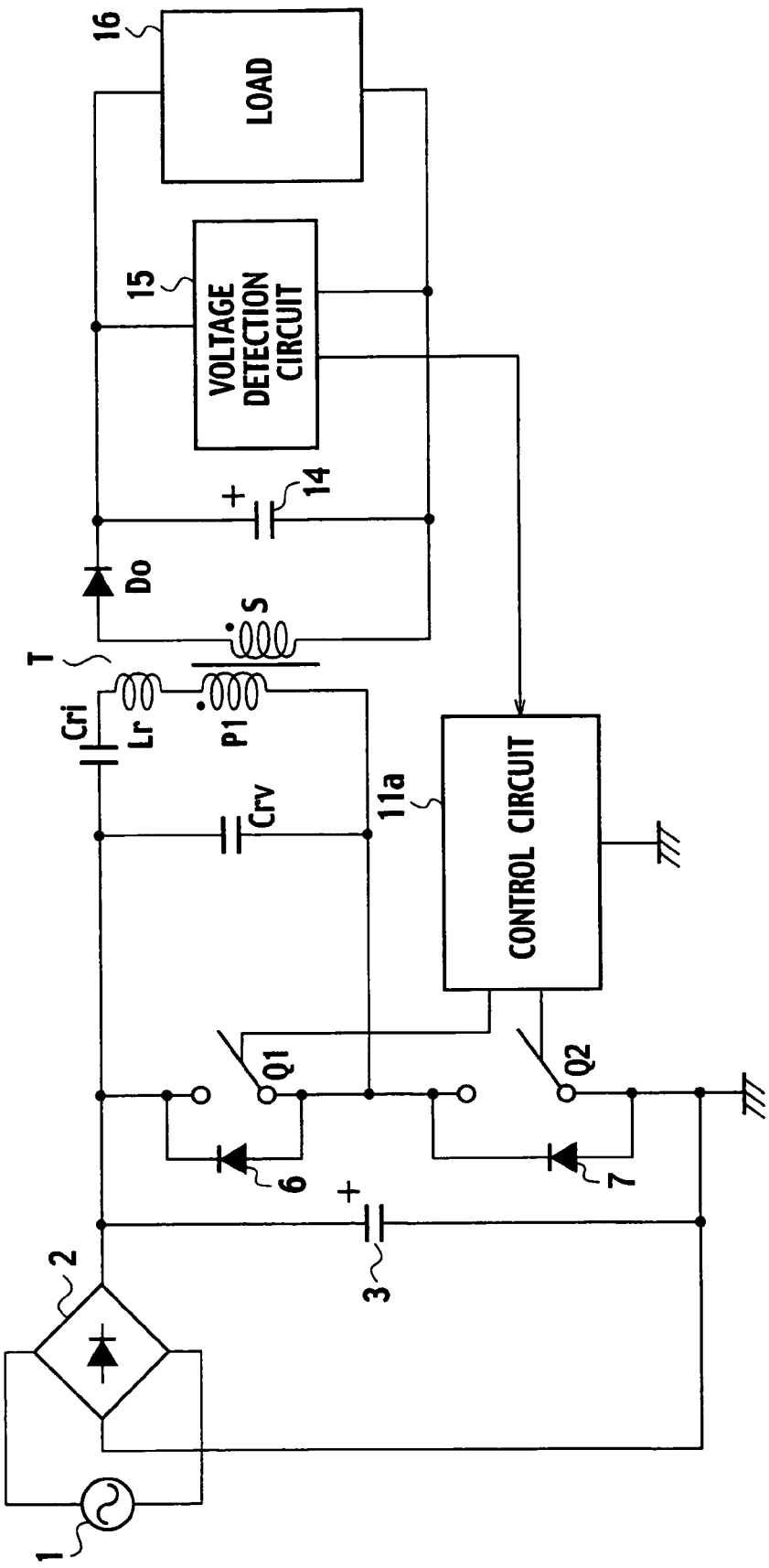
FIG. 1 is a circuit block diagram in a conventional example 1 of a conventional switching power supply.
Figure 6:
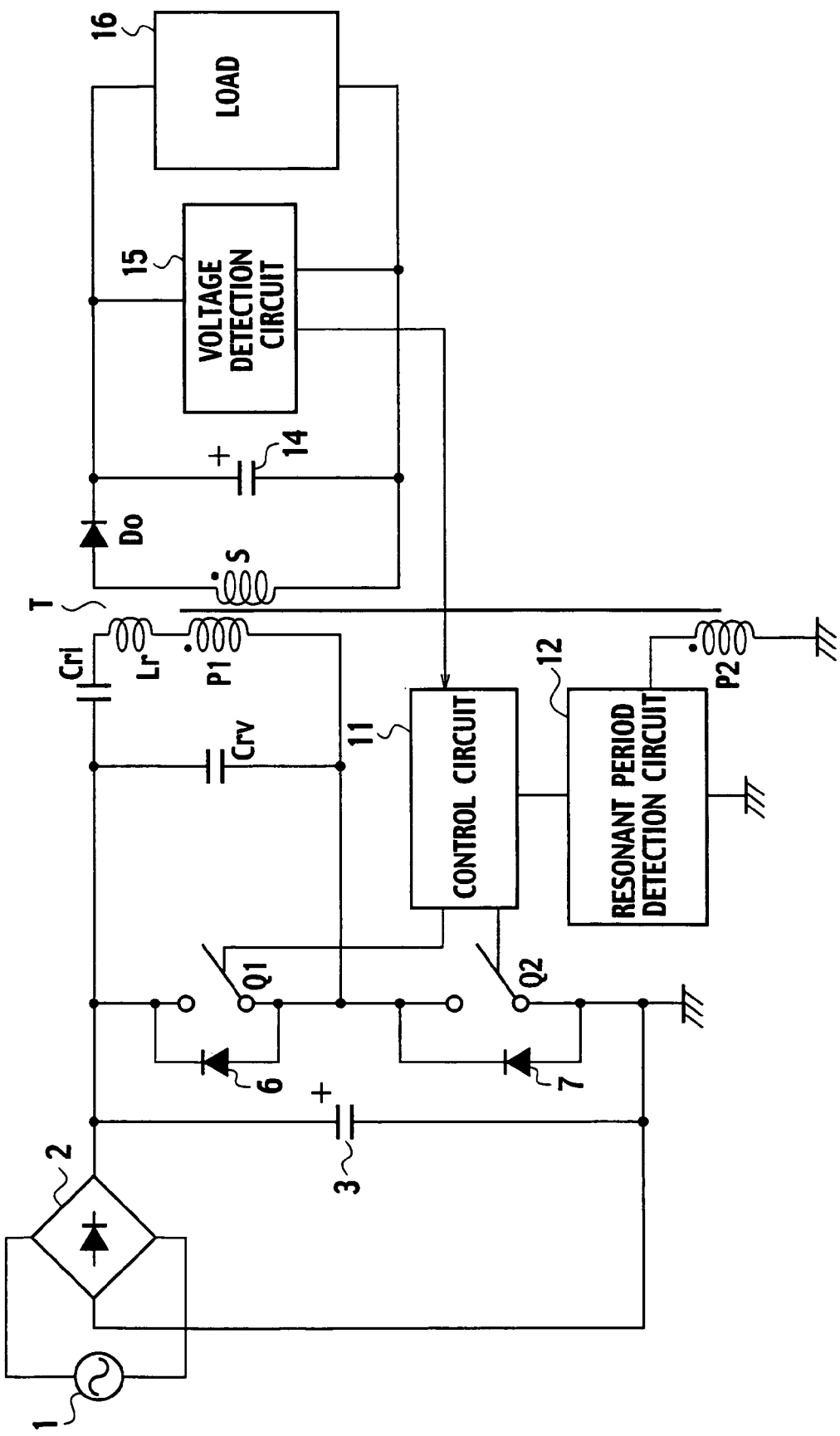
FIG. 6 is a circuit block diagram of a switching power supply according to a first embodiment.

FIG. 6 is a circuit block diagram of a switching power supply according to a first embodiment. The switching power supply according to the first embodiment additionally includes an auxiliary winding P2 and a resonant period detection circuit 12 with respect to the conventional switching power supply as shown in FIG. 1.

The auxiliary winding P2 is provided in the resonant transformer T, and tightly coupled to the secondary winding S. A specific example of the resonant transformer T having the auxiliary winding P2 will be explained later. The resonant period detection circuit 12 detects a period during which energy is transmitted from a primary side to a secondary side of the resonant transformer T based on a voltage of the auxiliary winding P2 of the resonant transformer T, and outputs a resonant period detection signal to the control circuit 11.

The control circuit 11 controls the voltage of the load 16 to a constant voltage by turning on and off alternately the first the resonant period detection signal.

Figure 8:
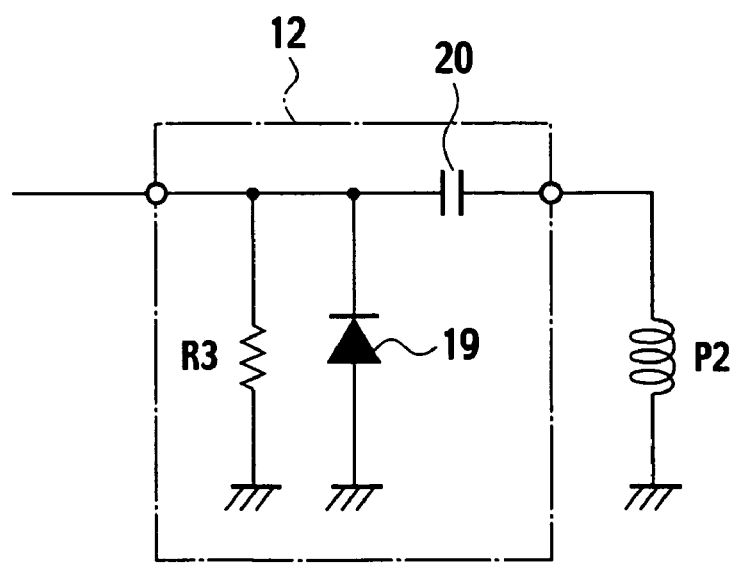
FIG. 8 shows a configuration example 2 of a resonant period detection circuit provided in the switching power supply according to the first embodiment.

FIG. 8 shows a configuration example 2 of the resonant period detection circuit provided in the switching power supply according to the first embodiment. The resonant period detection circuit 12 shown in FIG. 8 includes the rectifier 19 connected in parallel to the auxiliary winding P2 via the coupling capacitor 20 and a voltage detection resistance R3 connected in parallel to the rectifier 19, and the both terminal voltage of the voltage detection resistance R3 is outputted to the control circuit 11 as the resonant period detection signal.

Figure 2:
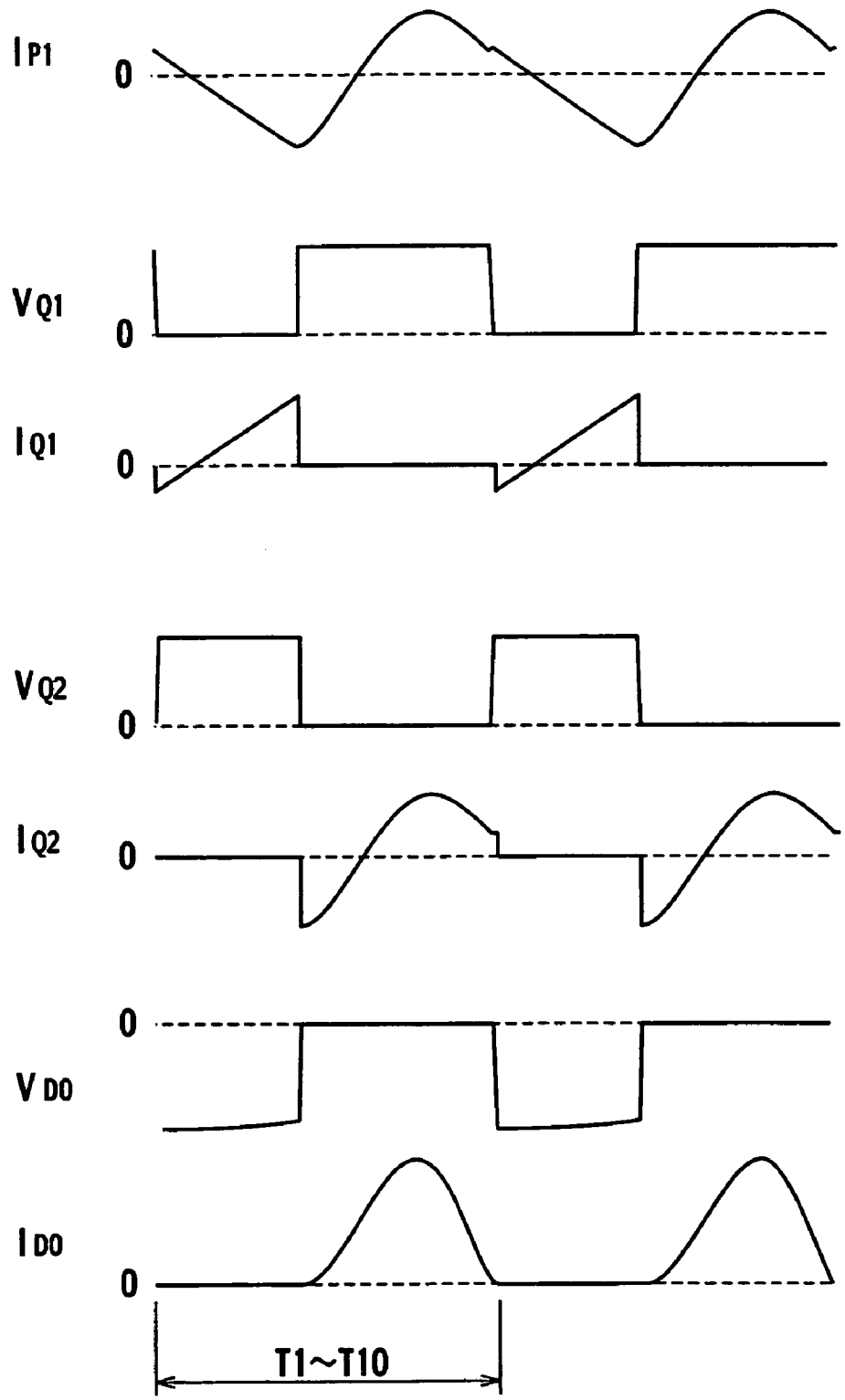
FIG. 2 is a timing chart of signals in respective units of the conventional switching power supply in the conventional example 1.
Figure 3:
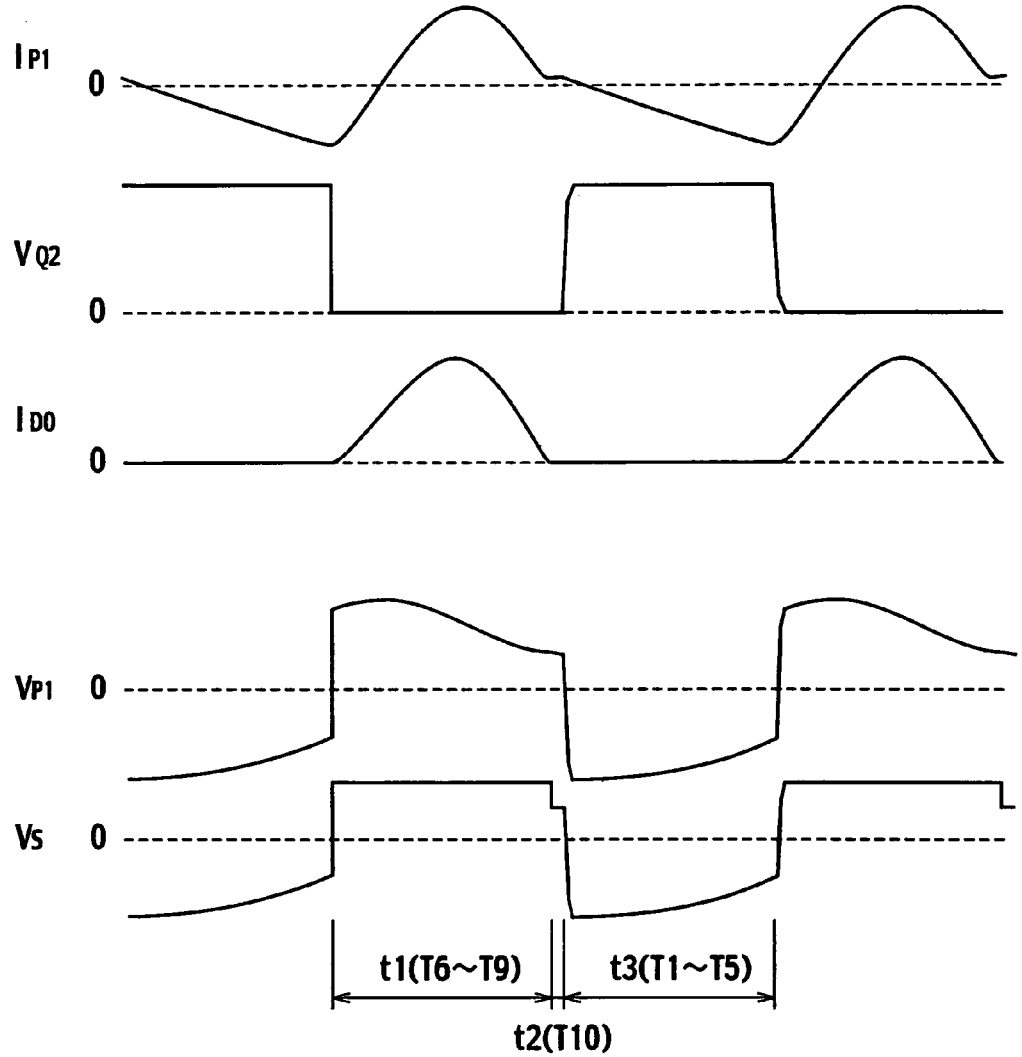
FIG. 3 is a timing chart of respective signals indicating in detail a period during which energy is transmitted from a primary side to a secondary side of a resonant transformer in the switching power supply in the conventional example 1.
Figure 4:
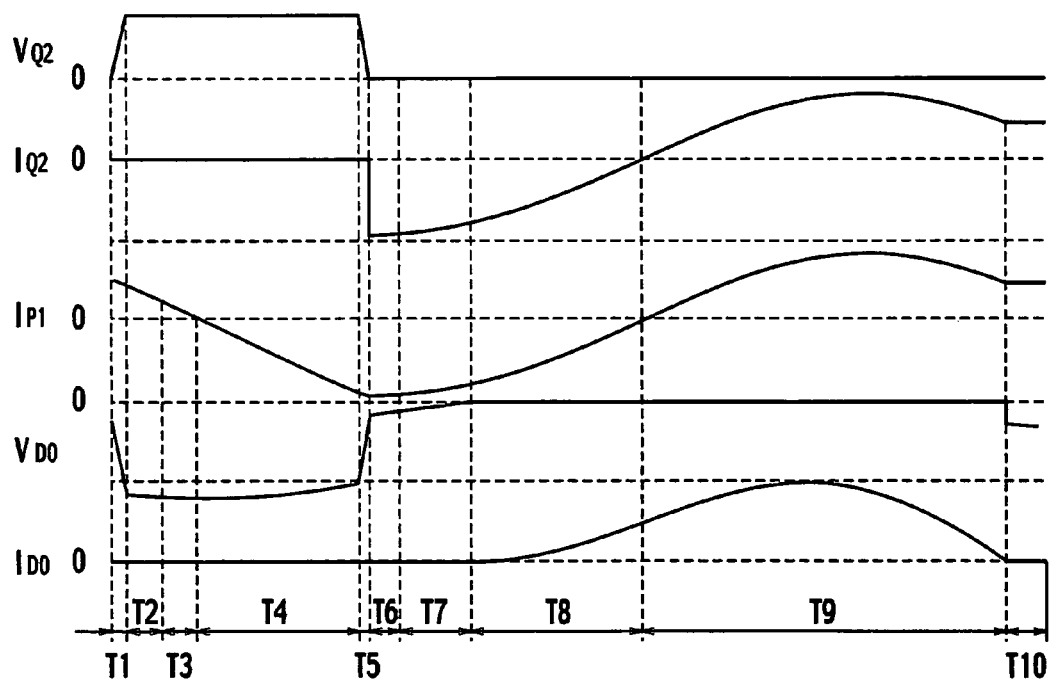
FIG. 4 is a detailed timing chart in periods T1 to T10 of a signal in the respective units of the switching power supply in the conventional example 1.
Figure 5:
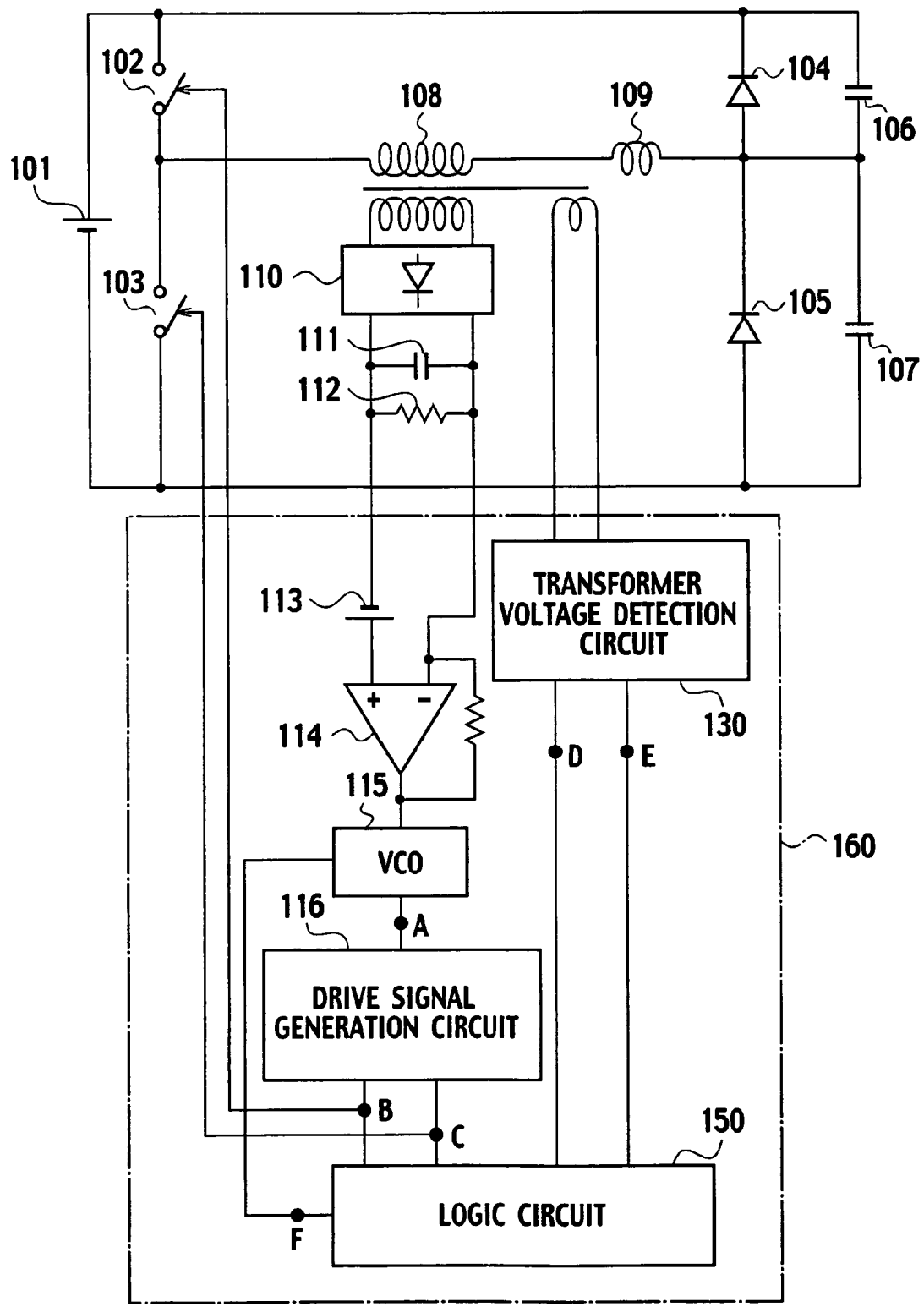
FIG. 5 is a circuit block diagram of an associated switching power supply.

The operation of the resonant switching power supply according to the first embodiment is explained. The basic operation is the same as the operation of the conventional switching power supply (the timing chart shown in FIGS. 2 to 4), and thus, the operation of the auxiliary winding P2 and the resonant period detection circuit 12 is explained with reference to timing charts shown in FIGS. 9 and 3.

Figure 9:
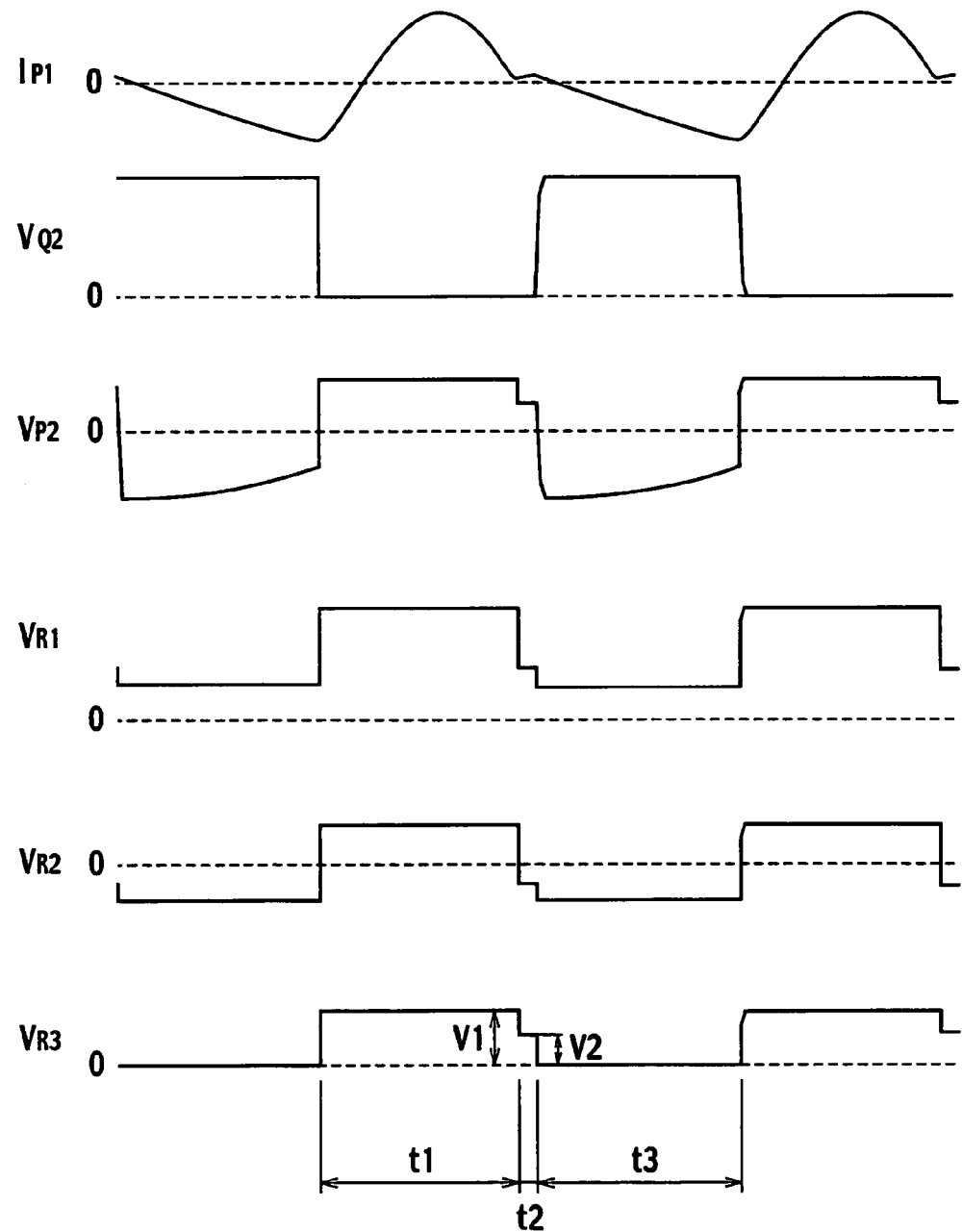
FIG. 9 is a timing chart of signals in respective units of the switching power supply according to the first embodiment.

In FIG. 9, reference sign $I_{P1}$ denotes the current flowing to the primary winding P1, $V_{Q2}$ denotes the both terminal voltage of the second switching element Q2, $V_{P2}$ denotes the both terminal voltage of the auxiliary winding P2, $V_{R1}$ denotes the both terminal voltage of the voltage detection resistance R1, $V_{R2}$ denotes the both terminal voltage of the voltage detection resistance R2, and $V_{R3}$ denotes the both terminal voltage of the voltage detection resistance R3.

A voltage $V_S$ induced by the secondary winding S of the resonant transformer T is clamped to a voltage obtained by adding a forward voltage drop of a rectifier $D_0$ to an output voltage, in a period T1 during which the second switching element Q2 is turned ON and supplies the energy to the secondary side via the resonant transformer T.

In period t2 during which the second switching element Q2 is ON but the energy is not supplied from the primary side to the secondary side of the resonant transformer T, the voltage becomes lower than the output voltage. Since the auxiliary winding P2 of the resonant transformer T is tightly coupled to the secondary winding S, a voltage $V_{P2}$, whose value is equal to the product of the auxiliary winding P2 by the turns ratio to the secondary winding S, is induced in the auxiliary winding P2.

Figure 7:
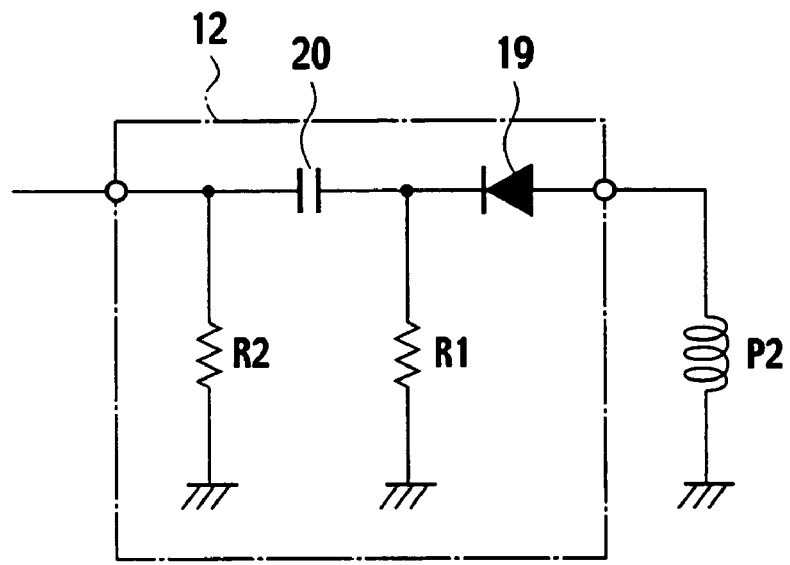
FIG. 7 shows a configuration example 1 of a resonant period detection circuit provided in the switching power supply according to the first embodiment.

In the voltage detection circuit 12, in the configuration example as shown in FIG. 7, the voltage $V_{R1}$ generated in the voltage detection resistance R1 has a waveform such that only the period (t1+t2), during which the second switching element Q2 is turned ON, is extracted from that of the voltage induced by the auxiliary winding P2 by the rectifier 19. Furthermore, only an AC component of the voltage generated in the voltage detection resistance R1 is extracted by the voltage detection resistance R2 via the coupling capacitor.

As shown in FIG. 9, the period t1, a time duration while the voltage $V_{R2}$ generated in the voltage detection resistance R2 is positive is the period t1 during which energy is transmitted from the primary side to the secondary side of the resonant transformer T.

In the configuration example shown in FIG. 8, the voltage $V_{R3}$ generated in the voltage detection resistance R3 has a waveform as shown in FIG. 9. Therefore, the control circuit 11 can detect the time t1 according to a voltage level of the voltage $V_{R3}$ generated in the voltage detection resistance R3, during which the energy is supplied to the secondary side. For example, when the voltage in the period t1 is designated as V1 and the voltage in the period t2 is designated as V2, a threshold can be set between V1 and V2, so that the control circuit 11 can determine a period during which the voltage $V_{R3}$ generated in the voltage detection resistance R3 is equal to or larger than the threshold as the period t1.

Thus, according to the switching power supply in the first embodiment, the period t1 during which the resonant transformer T supplies the energy to the secondary side can be detected by detecting the voltage level of the auxiliary winding P2.

The control circuit 11 controls so as to maintain the ON state of the second semiconductor Q2 and the OFF state of the first switching element Q1, in the period t1 during which energy is transmitted from the primary side to the secondary side of the resonant transformer T according to the voltage generated in the voltage detection resistance from the resonant period detection circuit 12.

Accordingly, in the period t1 during which energy is transmitted to the secondary side, the second switching element Q2 is not turned OFF, thereby realizing the zero current switching, and thus, a switching loss of the second switching element Q2 decreases, to improve the efficiency. If the ON period of the second switching element Q2 is set to be equal to or longer than the period t1, and the period t2 is set shorter, the loss decreases further, thereby improving the efficiency. In other words, switching control with optimum ON period can be realized, without causing off-resonance. Furthermore, the period t1 during which energy is supplied to the secondary side of the resonant transformer T can be detected with a simple circuit configuration as shown in FIGS. 7 and 8.

Configuration Example of Resonant Transformer

Figure 10:
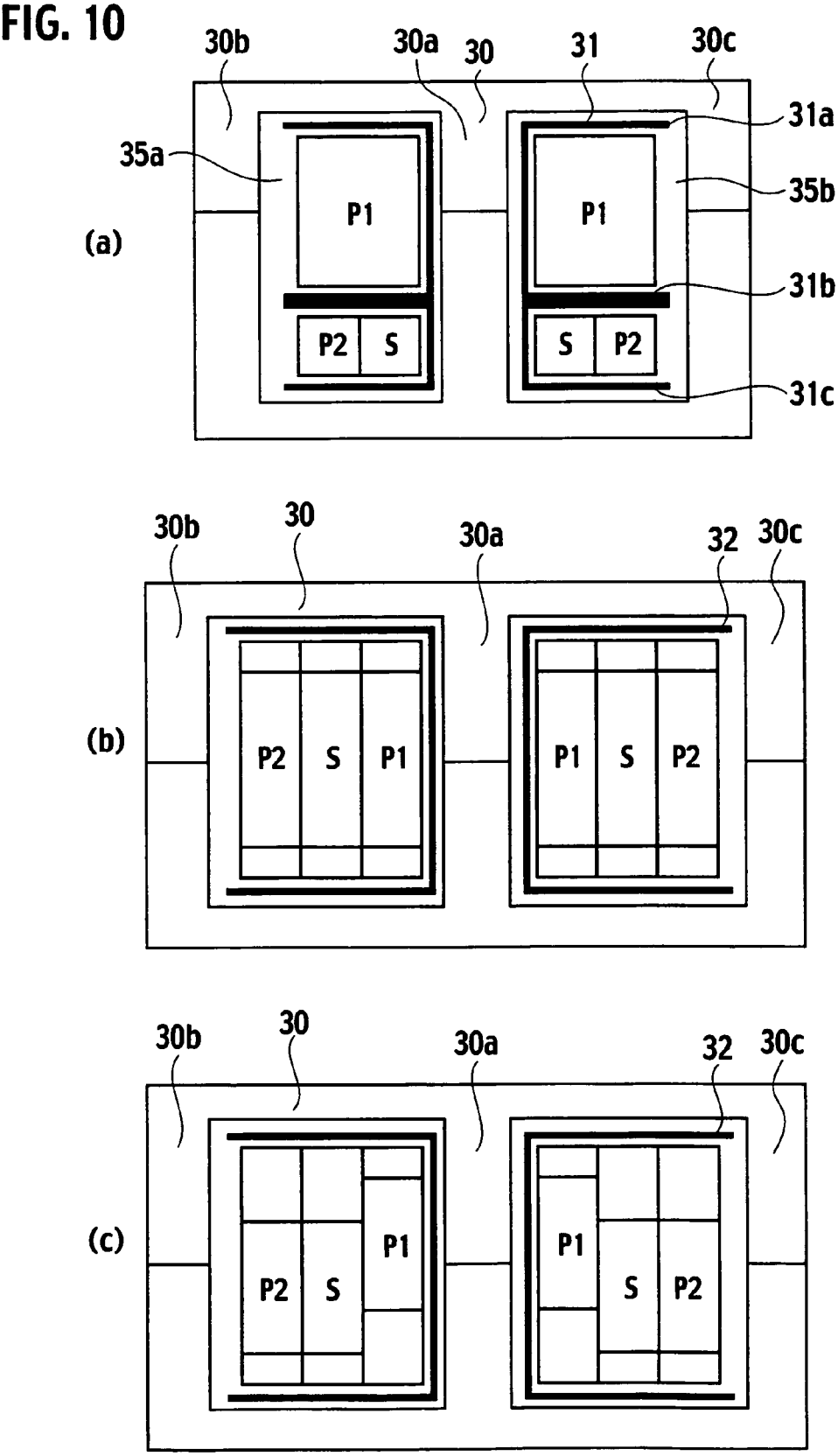
FIG. 10 shows a configuration example in which a secondary winding and an auxiliary winding of the resonant transformer provided in the switching power supply according to the first embodiment are tightly coupled.

FIG. 10 shows a configuration example of the secondary winding and the auxiliary winding of the resonant transformer being provided in the switching power supply according to the first embodiment and being tightly coupled to each other.

In the resonant transformer shown in FIG. 10(a), a cylindrical split bobbin 31 including flanges 31a to 31c is fitted to a central leg 30a constituting one magnetic path of a core 30 made of a magnetic material. The primary winding P1 is wound between the flanges 31a and 31b of the split bobbin 31, the secondary winding S is wound between the flanges 31b and 31c, and the auxiliary winding P2 is wound on the secondary winding S to tightly couple the auxiliary winding P2 with the secondary winding S. The core 30 has a rectangular external shape, and spaces 35a and 35b are formed in the core 30 in parallel in a longitudinal direction of the magnetic path, so as to form the magnetic paths 30a, 30b, and 30c.

In the resonant transformer shown in FIG. 10(b), a cylindrical bobbin 32 including a flange 32 is fitted to the central leg 30a of the core 30, and the primary winding P1 is wound around the bobbin 32, the secondary winding S is wound on the primary winding P1, and the auxiliary winding P2 is wound on the secondary winding S to tightly couple the auxiliary winding P2 with the secondary winding S.

In the example shown in FIG. 10(b), the respective windings are wound at the same position with respect to a former. In the example as shown in FIG. 10(c), in contrast, the winding positions of the primary winding P1 and the secondary winding S are shifted with respect to the former, so that the primary winding P1 and the secondary winding S are loosely coupled, and the winding positions of the secondary winding S and the auxiliary winding P2 are arranged, so that the auxiliary winding P2 is tightly coupled with the secondary winding S rather than the primary winding P1.

Second Embodiment

Figure 11:
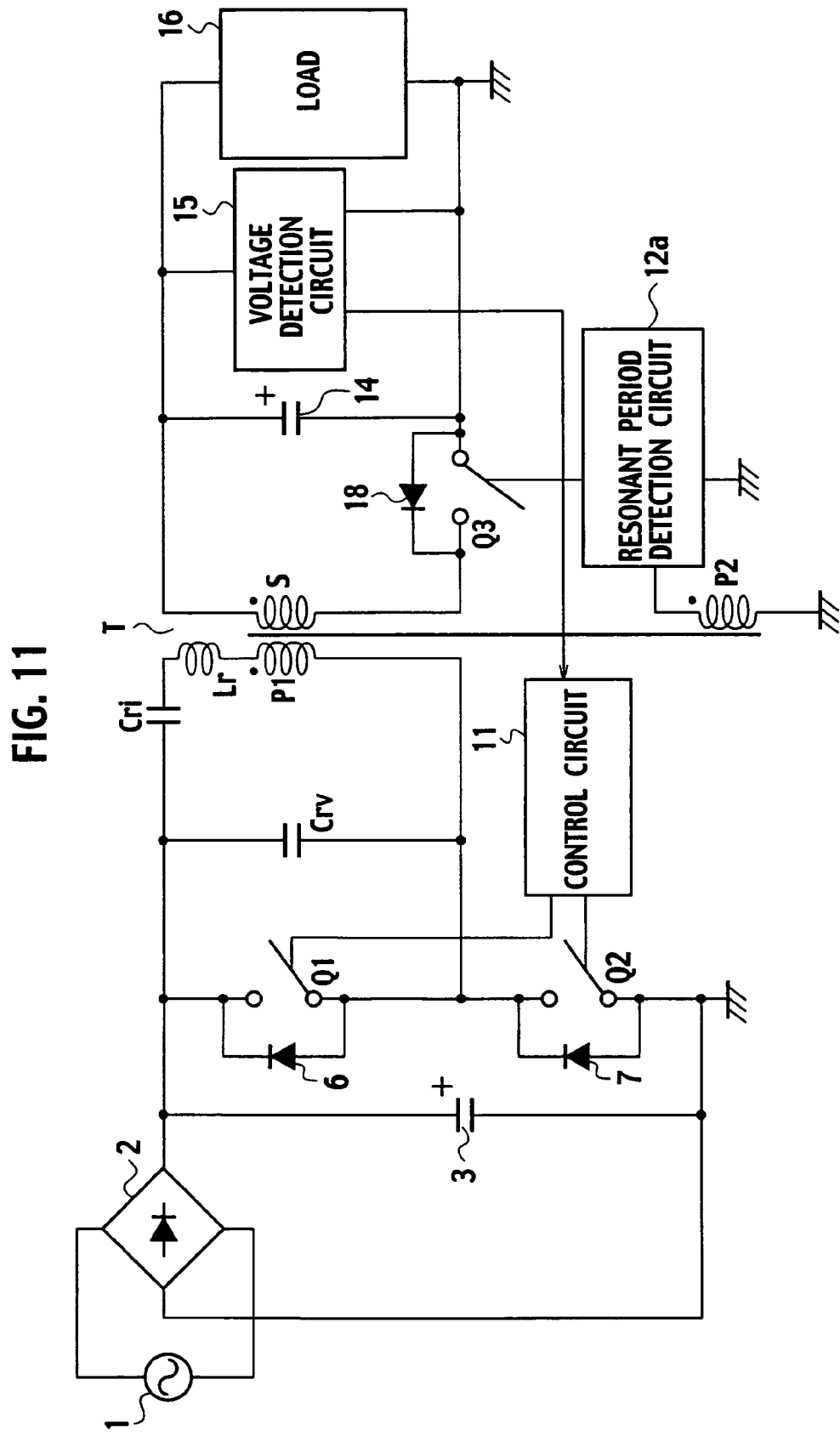
FIG. 11 is a circuit block diagram of a switching power supply according to a second embodiment.

A resonant switching power supply according to a second embodiment is explained. FIG. 11 is a circuit block diagram of a switching power supply according to the second embodiment.

The switching power supply according to the second embodiment shown in FIG. 11 is characterized in that a synchronous rectifier circuit formed by a parallel circuit of a switching element Q3 formed by a MOSFET or the like and a rectifier 18 is provided between the secondary winding S and the smoothing capacitor 14, instead of the rectifier $D_0$ provided on the secondary side of the resonant transformer T, with respect to the switching power supply according to the first embodiment shown in FIG. 6. Synchronous rectification operation is performed by using the switching element Q3 formed by the MOSFET or the like, thereby decreasing the loss.

The auxiliary winding P2 and the resonant period detection circuit 12a are also provided, and the resonant period detection circuit 12a turns on or off the switching element Q3 according to the resonant period detection signal based on the voltage generated in the auxiliary winding P2.

That is, since the switching element Q3 is turned on or off according to the resonant period detection signal from the resonant period detection circuit 12a, the synchronous rectification operation can be performed by turning on the switching element Q3 only in the period t1 during which energy is supplied from the primary side to the secondary side of the resonant transformer T.

Third Embodiment

Figure 12:
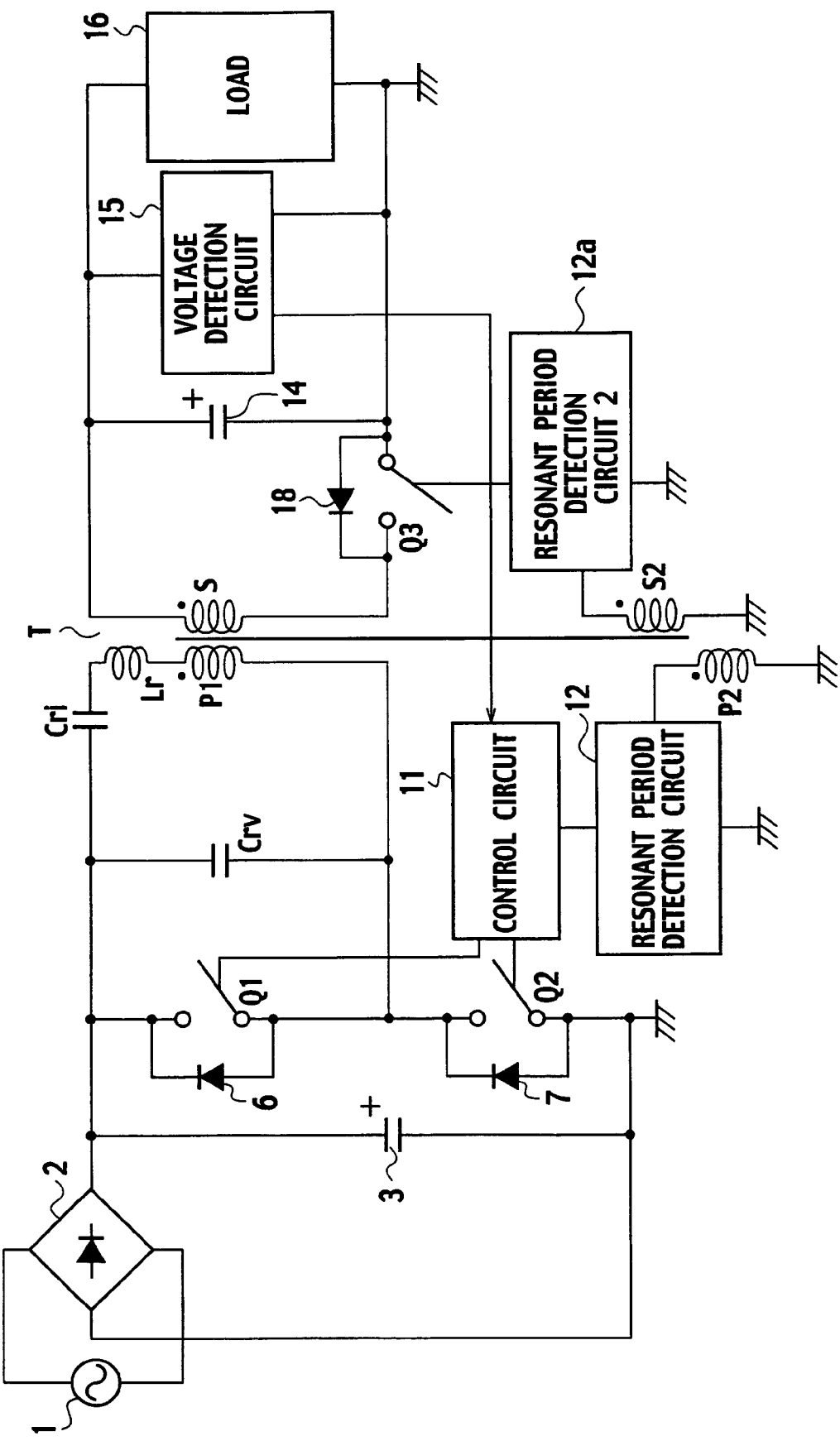
FIG. 12 is a circuit block diagram of a switching power supply according to a third embodiment.

The resonant switching power supply according to a third embodiment is explained. FIG. 12 is a circuit diagram of the switching power supply according to the third embodiment.

The switching power supply according to the third embodiment shown in FIG. 12 is formed by combining the switching power supply according to the first embodiment shown in FIG. 6 with the switching power supply according to the second embodiment shown in FIG. 11.

The resonant transformer T has the primary winding P1, the secondary winding S, and a first auxiliary winding P2 and a second auxiliary winding S2 tightly coupled with the secondary winding S. The first auxiliary winding P2 and the resonant period detection circuit 12 are provided on the primary side of the resonant transformer T, and the second auxiliary winding S2 and a resonant period detection circuit 12a are provided on the secondary side.

The resonant period detection circuit 12 detects a period during which energy is transmitted from the primary side to the secondary side of the resonant transformer T based on the voltage of the first auxiliary winding P2 of the resonant transformer T, and outputs the resonant period detection signal. The control circuit 11 controls the second switching element Q2 to maintain the ON state and the first switching element Q1 to maintain the OFF state in the period during energy is transmitted from the primary side to the secondary side of the resonant transformer T based on the resonant period detection signal from the resonant period detection circuit 12.

The synchronous rectifier circuit formed by a parallel circuit of the switching element Q3 formed by the MOSFET or the like and the rectifier 18 is provided between the secondary winding S and the smoothing capacitor 14. The resonant detection circuit 12a detects the period during which energy is transmitted from the primary side to the secondary side of the resonant transformer T according to the voltage of the second auxiliary winding S2 of the resonant transformer T, and turns on or off the switching element Q3 according to the resonant period detection signal.

Thus, according to the switching power supply in the third embodiment, the respective switching elements Q1 to Q3 can be turned ON or OFF at the optimum timing by providing the resonant period detection circuits 12 and 12a on the primary and secondary sides of the resonant transformer T, respectively.

The present invention is not limited to the first to the third embodiments. In the first to the third embodiments, an AC power source 1, the full-wave rectifier 2, and the smoothing capacitor 3 are used. It is noted that the power source being connected to the opposite ends of the series circuit of the first switching element Q1 and the second switching element Q2 needs only to be a non-AC power source, and a DC power source can be also used. That is, in the present invention, the series circuit of the first switching element Q1 and the second switching element Q2 is connected in parallel to the output of the non-AC power source.

In the first to the third embodiments, the series circuit formed with the current resonant capacitor Cri, the reactor Lr, and the primary winding P1 of the resonant transformer T is connected to the opposite ends of the first switching element Q1. It is noted that, for example, a series circuit formed with the current resonant capacitor Cri, the reactor Lr, and the primary winding P1 of the resonant transformer T can be connected to the opposite ends of the second switching element Q2.

In the first to the third embodiments, further, the voltage resonant capacitor Crv is connected to the opposite ends of the first switching element Q1. It is noted that, the voltage resonant capacitor Crv can be connected to the opposite ends of the second switching element Q2.

EFFECTS OF THE INVENTION

According to the first technical aspect of the present invention, since the auxiliary winding of the resonant transformer is tightly coupled with the secondary winding, and the resonant period detector detects a period during which energy is transmitted from the primary side to the secondary side of the resonant transformer based on the voltage of the auxiliary winding, and outputs the resonant period detection signal, the period during which the energy is supplied to the secondary side can be accurately detected.

According to the second and the third technical aspects of the present invention, the period during which energy is supplied to the secondary side can be accurately detected with a simple circuit configuration.

According to the fourth technical aspect of the present invention, since the control circuit controls so as to maintain the ON state or the OFF state of the respective switching elements in the period during which energy is transmitted from the primary side to the secondary side of the resonant transformer based on the resonant period detection signal from the resonant period detector, the switching control with the optimum ON period can be performed, without causing off-resonance, thereby improving the efficiency.

According to the fifth technical aspect of the present invention, since the resonant period detector turns on or off the third switching element according to the resonant period detection signal, the synchronous rectification operation can be performed by turning on the third switching element only in the period during which energy is supplied to the secondary side.

According to the sixth technical aspect of the present invention, the respective switching elements can be turned on and off at the optimum timing by providing the first and the second resonant period detectors, respectively, on the primary side and the secondary side of the resonant transformer.

INDUSTRIAL APPLICABILITY

The present invention can be applied to switching power supplies, such as a DC-DC converter and an AC-DC converter.

The invention claimed is:

1. A switching power supply comprising:
a resonant transformer having a primary winding, a secondary winding, and an auxiliary winding tightly coupled to the secondary winding;
a first series circuit in which a first switching element and a second switching element connected in parallel to an output of a non-AC power source are serially connected;
a voltage resonant capacitor connected to opposite ends of the first switching element or the second switching element;
a second series circuit in which a current resonant capacitor, a resonant reactor and the primary winding of the resonant transformer are serially connected;
a rectifying and smoothing circuit that rectifies and smoothes a voltage of the secondary winding of the resonant transformer;
a control circuit turning on and off alternately the first switching element and the second switching element according to an output voltage of the rectifying and smoothing circuit; and
a resonant period detector detecting a period during which energy is transmitted from a primary side to a secondary side of the resonant transformer based on a voltage of the auxiliary winding of the resonant transformer, and outputting a resonant period detection signal.

2. The switching power supply according to claim 1, wherein the resonant period detector comprises:
a rectifier serially connected to the auxiliary winding; and
a first resistance connected in parallel to a series circuit of the auxiliary winding and the rectifier, and a second resistance connected in parallel to the first resistance via a coupling capacitor, and
the resonant period detector outputs voltage between both terminals of the second resistance.

3. The switching power supply according to claim 1, wherein the resonant period detector comprises:
a rectifier connected in parallel to the auxiliary winding via a coupling capacitor; and
a resistance connected in parallel to the rectifier, and
the resonant period detector outputs voltage between both terminals of the resistance.

4. The switching power supply according to claim 1, wherein:
the resonant period detector transmits the resonant period detection signal to the control circuit; and
the control circuit controls the respective switching elements to maintain the ON state or the OFF state thereof in a period during energy is transmitted from the primary side to the secondary side of the resonant transformer, based on the resonant period detection signal from the resonant period detector.

5. The switching power supply according to claim 2, wherein:
the resonant period detector transmits the resonant period detection signal to the control circuit, and
the control circuit controls the respective switching elements to maintain the ON state or the OFF state thereof in a period during energy is transmitted from the primary side to the secondary side of the resonant transformer, based on the resonant period detection signal from the resonant period detector.

6. The switching power supply according to claim 3, wherein:
the resonant period detector transmits the resonant period detection signal to the control circuit, and
the control circuit controls the respective switching elements to maintain the ON state or the OFF state thereof in a period during energy is transmitted from the primary side to the secondary side of the resonant transformer, based on the resonant period detection signal from the resonant period detector.

7. The switching power supply according to claim 1, wherein:
the rectifying and smoothing circuit has a third switching element rectifying the voltage of the secondary winding of the resonant transformer; and
the resonant period detector turns on or off the third switching element based on the resonant period detection signal.

8. The switching power supply according to claim 2, wherein:
the rectifying and smoothing circuit has a third switching element rectifying the voltage of the secondary winding of the resonant transformer, and
the resonant period detector turns on or off the third switching element based on the resonant period detection signal.

9. The switching power supply according to claim 3, wherein:
the rectifying and smoothing circuit has a third switching element rectifying the voltage of the secondary winding of the resonant transformer; and
the resonant period detector turns on or off the third switching element based on the resonant period detection signal.

10. A switching power supply comprising:
a resonant transformer having a primary winding, a secondary winding, and a first auxiliary winding and a second auxiliary winding each being tightly coupled to the secondary winding;
a first series circuit constituted with a first switching element and a second switching element being serially connected to each other, the first series circuit being connected in parallel to an output of a non-AC power source;
a second series circuit constituted with a current resonant capacitor, a resonant reactor, and the primary winding of the resonant transformer being serially connected to opposite ends of the first switching element or the second switching element;

a rectifying and smoothing circuit rectifying and smoothing a voltage of the secondary winding of the resonant transformer;

a control circuit turning on and off alternately the first switching element and the second switching element, based on an output voltage of the rectifying and smoothing circuit;

a first resonant period detector detecting a period during which energy is transmitted from a primary side to a secondary side of the resonant transformer based on a voltage of the first auxiliary winding of the resonant transformer, and outputting a resonant period detection signal; and a second resonant period detector detecting a period during which energy is transmitted from the primary side to the secondary side of the resonant transformer based on a voltage of the second auxiliary winding of the resonant transformer, and outputting a resonant period detection signal, wherein the rectifying and smoothing circuit has a third switch rectifying the voltage of the secondary winding of the resonant transformer, and the second resonant period detector turns on or off the third switching element based on the resonant period detection signal.

* * * * *